(12) United States Patent
Zhang et al.

(10) Patent No.: US 12,096,101 B2
(45) Date of Patent: Sep. 17, 2024

(54) TERMINAL, PHOTOGRAPHING METHOD AND STORAGE MEDIUM

(71) Applicant: HuiZhou TCL Mobile Communication Co., Ltd., Guangdong (CN)

(72) Inventors: Junjie Zhang, Guangdong (CN); Zhiwen Sun, Guangdong (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 290 days.

(21) Appl. No.: 17/440,819

(22) PCT Filed: Oct. 29, 2019

(86) PCT No.: PCT/CN2019/114018
§ 371 (c)(1),
(2) Date: Sep. 20, 2021

(87) PCT Pub. No.: WO2021/031339
PCT Pub. Date: Feb. 25, 2021

(65) Prior Publication Data
US 2022/0191350 A1    Jun. 16, 2022

(30) Foreign Application Priority Data
Aug. 21, 2019 (CN) .......................... 201910771847.2

(51) Int. Cl.
*H04N 23/51* (2023.01)
*G02B 5/20* (2006.01)
(Continued)

(52) U.S. Cl.
CPC ............. *H04N 23/51* (2023.01); *G02B 5/208* (2013.01); *G06T 7/11* (2017.01); *H04N 5/265* (2013.01);
(Continued)

(58) Field of Classification Search
CPC ........ G02B 5/208; G03B 30/00; G03B 37/04; G06F 1/1637; G06F 1/1686;
(Continued)

(56) References Cited

U.S. PATENT DOCUMENTS 8,861,089 B2    10/2014 Duparre
10,225,515 B1*  3/2019 Sun ........................ G06F 1/3287
(Continued)

FOREIGN PATENT DOCUMENTS

CN    106060364    10/2016
CN    105578063    4/2018
(Continued)

OTHER PUBLICATIONS

International Search Report and the Written Opinion Dated Jun. 2, 2020 From the International Searching Authority Re. Application No. PCT/CN2019/114018 and Its Translation of Search Report Into English. (9 Pages).
(Continued)

*Primary Examiner* — Amy R Hsu

(57) ABSTRACT

A terminal, a photographing method and a storage medium are disclosed. A terminal includes a shell, a first camera module, a second camera module, and a display panel. The shell includes a base plate and a side plate thereon. The first camera module and second camera module are located in a storage space formed by the base place and the side plate. The display panel is a transparent display panel having a transparent portion corresponding to the first camera module and second camera module. The first camera module obtains a light signal having a wavelength within a first wave band, the second camera module obtains a light signal having a wavelength within a first wave band, and a minimum wavelength of the second wave band is greater than a maximum wavelength of the first wave band.

12 Claims, 7 Drawing Sheets

(51) Int. Cl.
*G06T 7/11* (2017.01)
*H04M 1/02* (2006.01)
*H04N 5/265* (2006.01)
*H04N 23/45* (2023.01)
*H04N 23/53* (2023.01)
*H04N 23/80* (2023.01)

(52) U.S. Cl.
CPC ............. *H04N 23/45* (2023.01); *H04N 23/53* (2023.01); *H04N 23/80* (2023.01); *G06T 2207/20021* (2013.01); *G06T 2207/20212* (2013.01); *H04M 1/0264* (2013.01)

(58) Field of Classification Search
CPC . G06T 2207/20021; G06T 2207/20212; G06T 7/11; H04M 1/0264; H04M 2250/52; H04N 23/45; H04N 23/51; H04N 23/53; H04N 23/54; H04N 23/57; H04N 23/80; H04N 5/265
See application file for complete search history.

(56) References Cited

U.S. PATENT DOCUMENTS

| | | | |
|---|---|---|---|
| 10,750,073 | B2 | 8/2020 | Jia |
| 11,320,681 | B2 * | 5/2022 | Son ........................ B32B 17/06 |
| 11,671,692 | B2 * | 6/2023 | Hou ....................... H04N 23/56 |
| | | | 348/374 |
| 2017/0272694 | A1 * | 9/2017 | Chiang ................ G09G 3/2003 |
| 2019/0213311 | A1 | 7/2019 | Tussy |
| 2020/0412854 | A1 | 12/2020 | Cheng |

FOREIGN PATENT DOCUMENTS

| | | |
|---|---|---|
| CN | 108667968 | 10/2018 |
| CN | 108881528 | 11/2018 |
| CN | 109379465 | 2/2019 |
| CN | 208890852 | 5/2019 |
| CN | 208956167 | 6/2019 |
| CN | 110139033 | 8/2019 |
| CN | 110336907 | 10/2019 |

OTHER PUBLICATIONS

Notification of Office Action and Search Report Dated Mar. 4, 2020 From the State Intellectual Property Office of the People's Republic of China Re. Application No. 201910771847.2 and Its Translation of Office Action Into English. (15 Pages).

Notification of Office Action and Search Report Dated Jul. 3, 2020 From the State Intellectual Property Office of the People's Republic of China Re. Application No. 201910771847.2 and Its Translation of Office Action Into English. (19 Pages).

\* cited by examiner

TERMINAL, PHOTOGRAPHING METHOD AND STORAGE MEDIUM

RELATED APPLICATIONS

This application is a National Phase of PCT Patent Application No. PCT/CN2019/114018 having International filing date of Oct. 29, 2019, which claims the benefit of priority of Chinese Patent Application No. 201910771847.2 filed on Aug. 21, 2019. The contents of the above applications are all incorporated by reference as if fully set forth herein in their entirety.

FIELD AND BACKGROUND OF THE INVENTION

The present invention relates to a communication technology, and more particularly, to a terminal, a photographing method and a storage medium.

As the development of the technology, the demands for mobile terminals become higher. In addition to some basic functions, such as audio, video, photographing, and internet, a larger screen-to-body ratio becomes a new demand. However, because of the functional differences between the front camera and the display panel, the front camera occupies a certain area of the front of the cell phone and thus reduces the screen-to-body ratio.

Conventionally, the front camera module could be placed below the display panel to raise the screen-to-body ratio. However, due to the specific structure of the display panel, it may affect the optical performance of the conventional front camera module and reduce the image quality of the front camera module.

SUMMARY OF THE INVENTION

One objective of an embodiment of the present invention is to provide a terminal capable of raising the image quality of the camera module.

According to an embodiment of the present invention, a terminal is disclosed. The terminal comprises: a shell, a first camera module and a second camera module; and a display panel, on the first camera module and the second camera module, wherein the display panel is a transparent display panel having a transparent portion corresponding to the first camera module and the second camera module. The shell comprises a base plate and a side plate on the base plate, and the base place and the side plate form a storage space. The first camera module and the second camera module are located in the storage space. The first camera module is configured to obtain a light signal having a wavelength within a first wave band. The second camera module is configured to obtain a light signal having a wavelength within a second wave band. A minimum wavelength of the second wave band is greater than a maximum wavelength of the first wave band.

In the terminal of the present disclosure, the first camera module comprises orderly arranged a first light sensing chip, a first filter, and a first camera; the display panel is close to a side of the first camera module. The side of the first camera module has the first camera; and a center wavelength of the first filter is 350 nm-750 nm.

In the terminal of the present disclosure, the first filter has a transparent rate of 75% for a specific wavelength range of visible light.

In the terminal of the present disclosure, the center wavelength of the first filter is 400 nm-500 nm.

In the terminal of the present disclosure, the first light sensing chip is a CCD chip or a CMOS chip.

In the terminal of the present disclosure, the first camera module further comprises a first circuit board, a first supporting structure, and a first voice coil motor; the first lighting sensing chip is positioned on the first circuit board; and the first supporting structure is configured to support the first filter and the first voice coil motor.

In the terminal of the present disclosure, the second camera module comprises orderly arranged a second light sensing chip, a second filter, and a second camera; the display panel is close to a side of the second camera module; the side of the second camera module has the second camera; and a center wavelength of the second filter is 3000 nm-10 µm.

In the terminal of the present disclosure, the second camera module further comprises a second circuit board, a second supporting structure, and a second voice coil motor.

In the terminal of the present disclosure, the terminal further comprises a plurality of rows of the first camera modules in the storage space. The second camera module is located between two adjacent rows of the first camera modules.

In the terminal of the present disclosure, the base plate is a rectangular base plate, having a peripheral area. The side plate is surrounding the peripheral area; the peripheral area has four corners. The first camera module and the second camera module are respectively placed in the corners. The first camera module is adjacent to the second camera module.

In the terminal of the present disclosure, the terminal further comprises a circuit main board, electrically connected to the first camera module and the second camera module.

In the terminal of the present disclosure, the terminal further comprises a cover, on the display panel, configured to protect the display panel.

According to another embodiment of the present invention, a photographing method used in a terminal is disclosed. The terminal includes: a shell having a base plate and a side plate on the base plate to form a storage space; a first camera module and a second camera module located in the storage space; and a display panel, on the first camera module and the second camera module, wherein the first camera module is configured to obtain a light signal having a wavelength within a first wave band, the second camera module is configured to obtain a light signal having a wavelength within a second wave band, a minimum wavelength of the second wave band is greater than a maximum wavelength of the first wave band. The photographing method includes: receiving a photographing command; controlling the first camera module to perform a photographing operation to obtain a first image and controlling the second camera module to perform a photographing operation to obtain a second image according to the photographing command; and synthesizing the first image and the second image to obtain a target image.

In the photographing method of the present disclosure, the step of synthesizing the first image and the second image to obtain the target image comprises: dividing the first image into a plurality of first sub-images and dividing the second image into a plurality of second sub-images; matching the first sub-images with the second sub-images to obtain a matching result; determining whether the first image and the second image have an overlapping region according to the matching result; and if the first image and the second image have an overlapping region, then replacing the overlapping region of the first image with the overlapping region of the second image to obtain the target image.

According to still another embodiment of the present invention, a storage medium storing a plurality of software instructions executable by a processor to perform operations comprising receiving a photographing command; controlling the first camera module to perform a photographing operation to obtain a first image and controlling the second camera module to perform a photographing operation to obtain a second image according to the photographing command; and synthesizing the first image and the second image to obtain a target image.

In the storage medium of the present disclosure, the operation of synthesizing the first image and the second image to obtain the target image comprises: dividing the first image into a plurality of first sub-images and dividing the second image into a plurality of second sub-images; matching the first sub-images with the second sub-images to obtain a matching result; determining whether the first image and the second image have an overlapping region according to the matching result; and if the first image and the second image have an overlapping region, then replacing the overlapping region of the first image with the overlapping region of the second image to obtain the target image.

According to yet another embodiment of the present invention, a terminal includes a storage device storing a plurality of software instructions and a processor, upon execution of the plurality of software instructions, performing operations comprising: receiving a photographing command; controlling the first camera module to perform a photographing operation to obtain a first image and controlling the second camera module to perform a photographing operation to obtain a second image according to the photographing command; and synthesizing the first image and the second image to obtain a target image.

In the terminal of the present disclosure, the operation of synthesizing the first image and the second image to obtain the target image comprises: dividing the first image into a plurality of first sub-images and dividing the second image into a plurality of second sub-images; matching the first sub-images with the second sub-images to obtain a matching result; determining whether the first image and the second image have an overlapping region according to the matching result; and if the first image and the second image have an overlapping region, then replacing the overlapping region of the first image with the overlapping region of the second image to obtain the target image.

The terminal of the present disclosure comprises: a shell, a first camera module and a second camera module; and a display panel, on the first camera module and the second camera module. The shell comprises a base plate and a side plate on the base plate, and the base place and the side plate form a storage space. The first camera module and the second camera module are located in the storage space. The first camera module is configured to obtain a light signal having a wavelength within a first wave band. The second camera module is configured to obtain a light signal having a wavelength within a first wave band. A minimum wavelength of the second wave band is greater than a maximum wavelength of the first wave band. The terminal has camera modules working in different wave bands. This could prevent the display panel from affecting the optical performance of the camera modules and thus raise the image quality.

DESCRIPTION OF SPECIFIC EMBODIMENTS OF THE INVENTION

Figure 1:
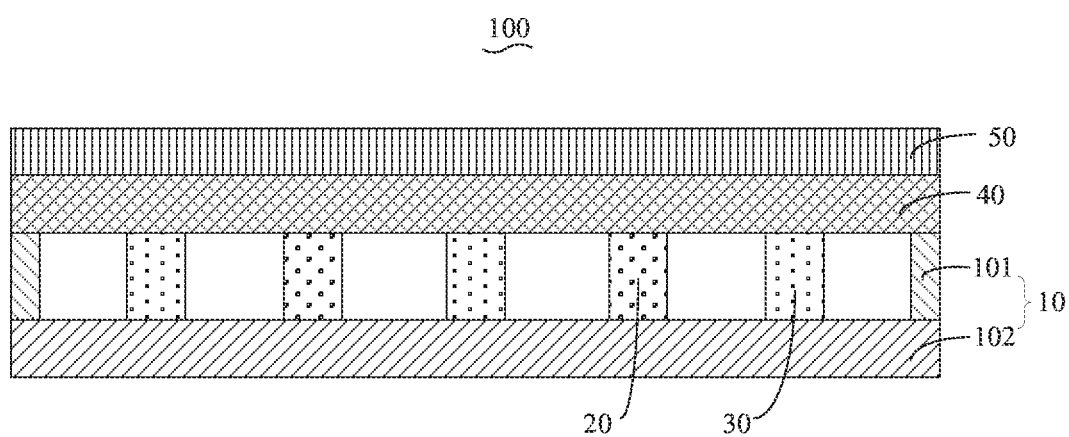
FIG. 1 is a diagram of a terminal according to a first embodiment of the present invention.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

Please refer to FIG. 1. FIG. 1 is a diagram of a terminal according to a first embodiment of the present invention. The terminal comprises a shell 10, a first camera module 20, a second camera module 30, and a display panel 40. The shell 10 comprises a base plate 101 and a side plate 102. The side plate 102 is placed on the base plate 101. The base plate 101 and the side plate 102 form a storage space. The first camera module 20 and the second camera module 30 are placed in the storage space. The display panel 40 is placed on the first camera module 20 and the second camera module 30.

The first camera module 20 is configured to obtain a light signal having a wavelength within a first wave band. The second camera module 30 is configured to obtain a light signal having a wavelength within a second wave band. The minimum wavelength of the second wave band is greater than the maximum wavelength of the first wave band.

The side plate 102 is a close structure on the base plate 101. In other words, the side plate 102 is a middle frame structure of the terminal such that the side plate 102 and the base plate 101 could form a storage space. The storage space stores at least one first camera module 20 and at least one second camera module 30. The first camera module 20 works in the first wave band and is configured to obtain a light signal having a wavelength within the first wave band. The second camera module 30 works in the second wave band and is configured to obtain a light signal having a wavelength within the second wave band. The minimum wavelength of the second wave band is greater than the maximum wavelength of the first wave band. Accordingly, the first camera module 20 and the second camera module 30 work in different wave bands.

The display panel 40 is placed on the first camera module 20 and the second camera module 30. The display panel could comprise an organic light emitting diode (OLED), a light emitting diode (LED) or a liquid crystal display (LCD). The OLED is a self-lighting component and the top of it has pixel areas defined by a pixel definition layer. The R, G, B, and W pixel units could be placed in the pixel areas and could be driven by the driving circuit to generate light of different colors. The LED and LCD require a display module, a liquid crystal layer, an electrode board, and/or other functional components to generate light. The lighting mechanism is to apply the voltage on the upper and lower plates sandwiching the liquid crystal layer to rotate the liquid crystals in the liquid crystal layer to a specific angle such that the polarized light could pass through the liquid crystal layer. The detailed operations are omitted here. The display panel 40 is a transparent display panel. The display panel 40 has a transparent portion corresponding to the first camera module 20 and the second camera module 30 and the other portion of the display panel 40 is non-transparent.

A cover 50 is placed on the display panel 40 to cover the display panel such that the display panel 40 is protected by the cover 50.

Figure 2:
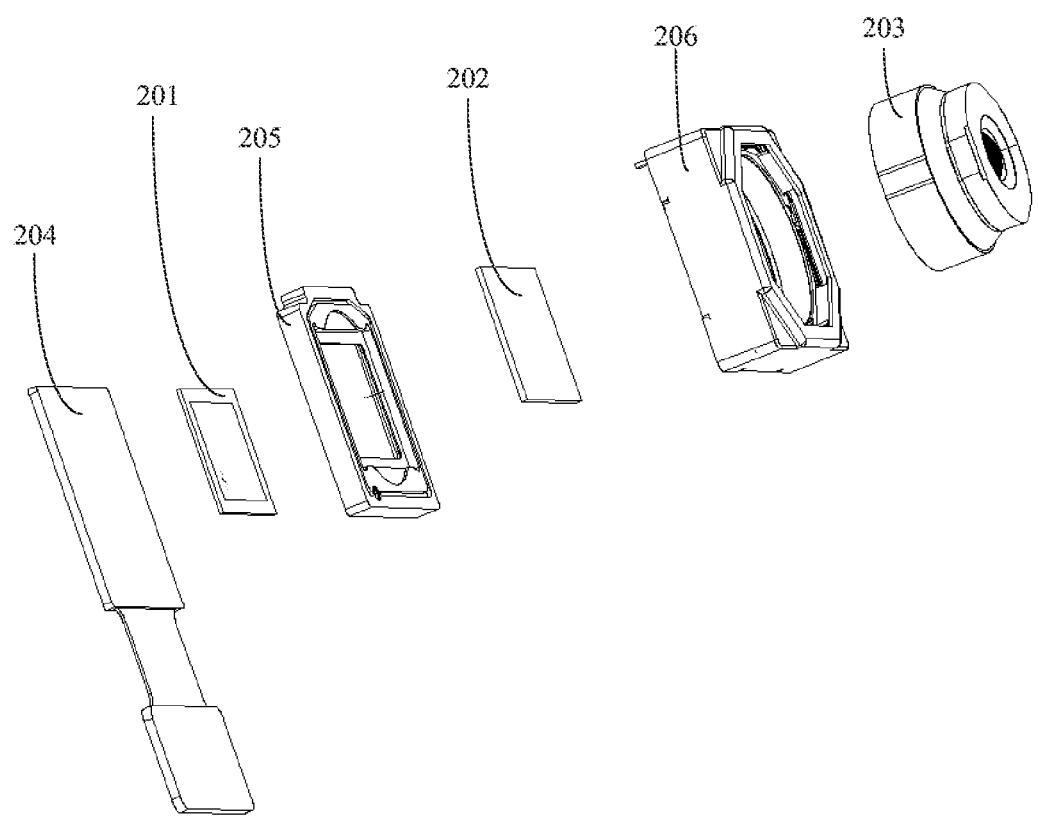
FIG. 2 is a diagram of a first camera module according to an embodiment of the present invention.

Please refer to FIG. 2. FIG. 2 is a diagram of a first camera module according to an embodiment of the present invention. The first camera module 20 comprises orderly-arranged a first light sensing chip 201, a first filter 202 and a first camera 203. The display panel 40 is close to the side of the first camera module 20 having the first camera 203.

The first camera 203 is configured to gather light. The first filter 202 is a filter having a transparent rate of 75% for a specific wavelength range of visible light and a transparent rate of lower than 10% for all the other wavelengths. The center frequency of the first filter 202 could be 350 nm-750 nm and is preferably 400-500 nm. The first light sensing chip 201 is configured to transform the light signal gathered by the first camera 203 into an electrical signal (i.e. photoelectric effect). The first light sensing chip 201 could be classified into two types: CCD (charge-coupled device) or CMOS (complementary metal-oxide-semiconductor). Further details are omitted here.

The first camera module 20 could comprise a first circuit board 204, a first supporting structure 205, and a first voice coil motor 206. The first lighting sensing chip 204 is positioned on the first circuit board 204. The image processor (DSP) is integrated in the first circuit board 204 and could integrate multiple image processing algorithms and RGB and/or UVC image data ports. The image processor integrates some common image processing algorithms in a hardware form into the chip. The image processing algorithms could comprise luminance control, contrast control, tone control, saturation control, sharpness control, gamma control algorithms. The first supporting structure 205 is configured to support the first filter 202 and the first voice coil motor 206. The first voice coil motor 206 works based on Ampere's circuital law. That is, when a current flows through the coil, the force introduced by the flowing current moves the first camera fixed on a carrier such that the focus distance is changed.

Figure 3:
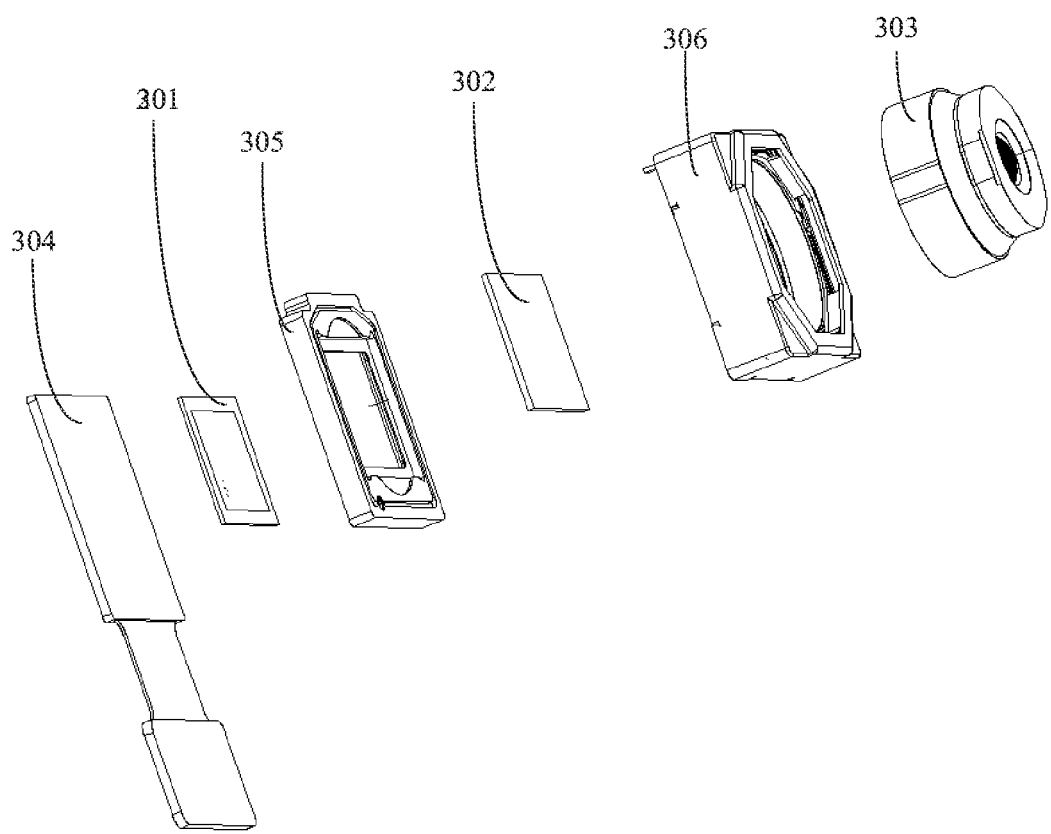
FIG. 3 is a diagram of a second camera module according to an embodiment of the present invention.

Please refer to FIG. 3. FIG. 3 is a diagram of a second camera module according to an embodiment of the present invention. The second camera module 30 comprises orderly arranged a second light sensing chip 301, a second filter 302, and a second camera 303. The display panel 40 is close to the side of the second camera module 30 having the second camera 303.

The second camera module 30 further comprises a second circuit board 304, a second supporting structure 305, and a second voice coil motor 306. The working mechanisms and the position relationships of them are similar to the first camera module 20 and thus omitted here. In addition, since the second camera module works in the visible light band, the center wavelength of the second filter 302 is 3000 nm-10 μm.

Figure 4:
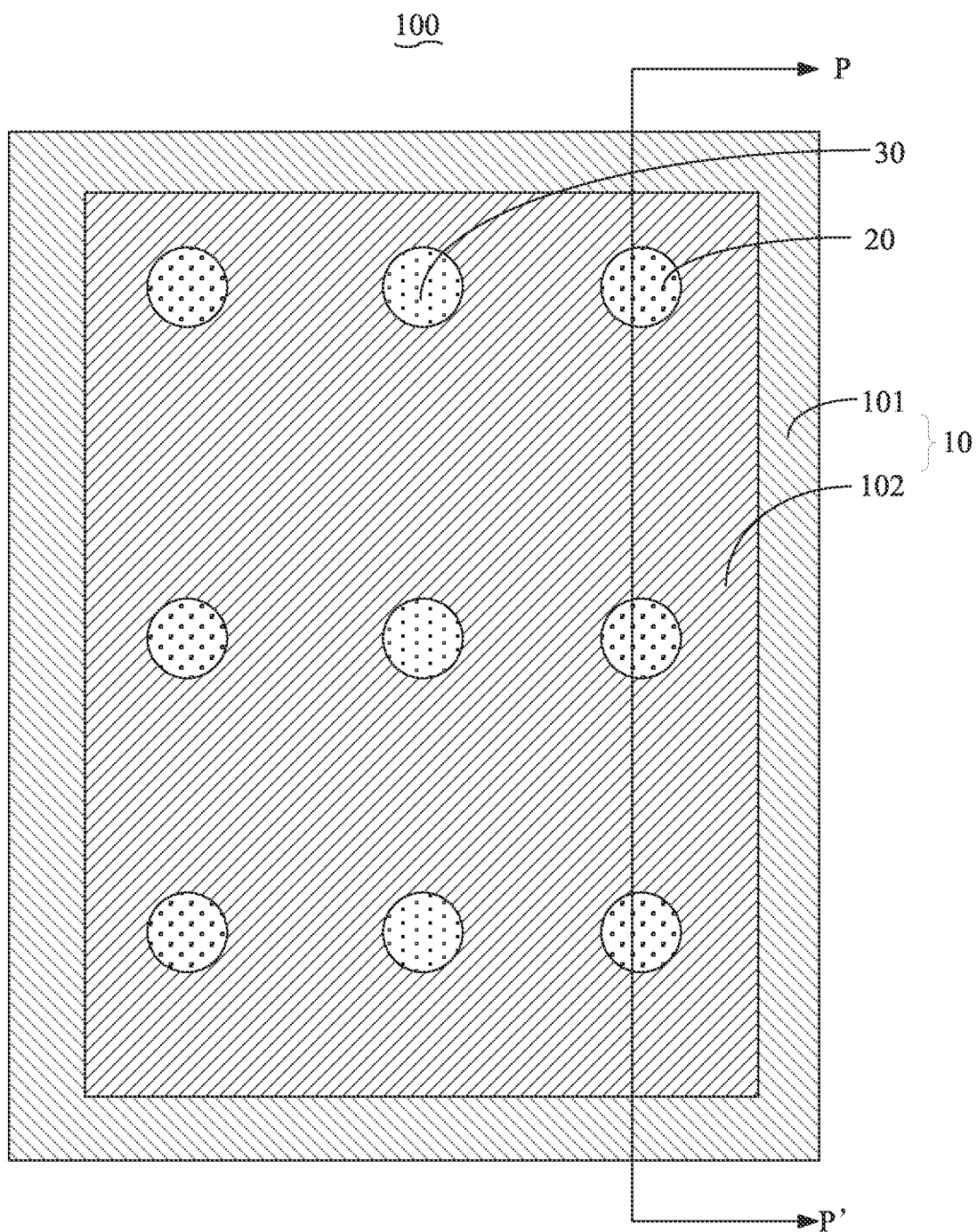
FIG. 4 is a diagram of a terminal according to a second embodiment of the present invention.

Please refer to FIG. 4. FIG. 4 is a diagram of a terminal according to a second embodiment of the present invention. In this embodiment, the first camera modules 20 are arranged in multiple rows in the storage space. The second camera modules 30 placed between each of two adjacent rows of the first camera modules 20. Here, FIG. 1 shows the cross section of P-P' line shown in FIG. 4.

Figure 5:
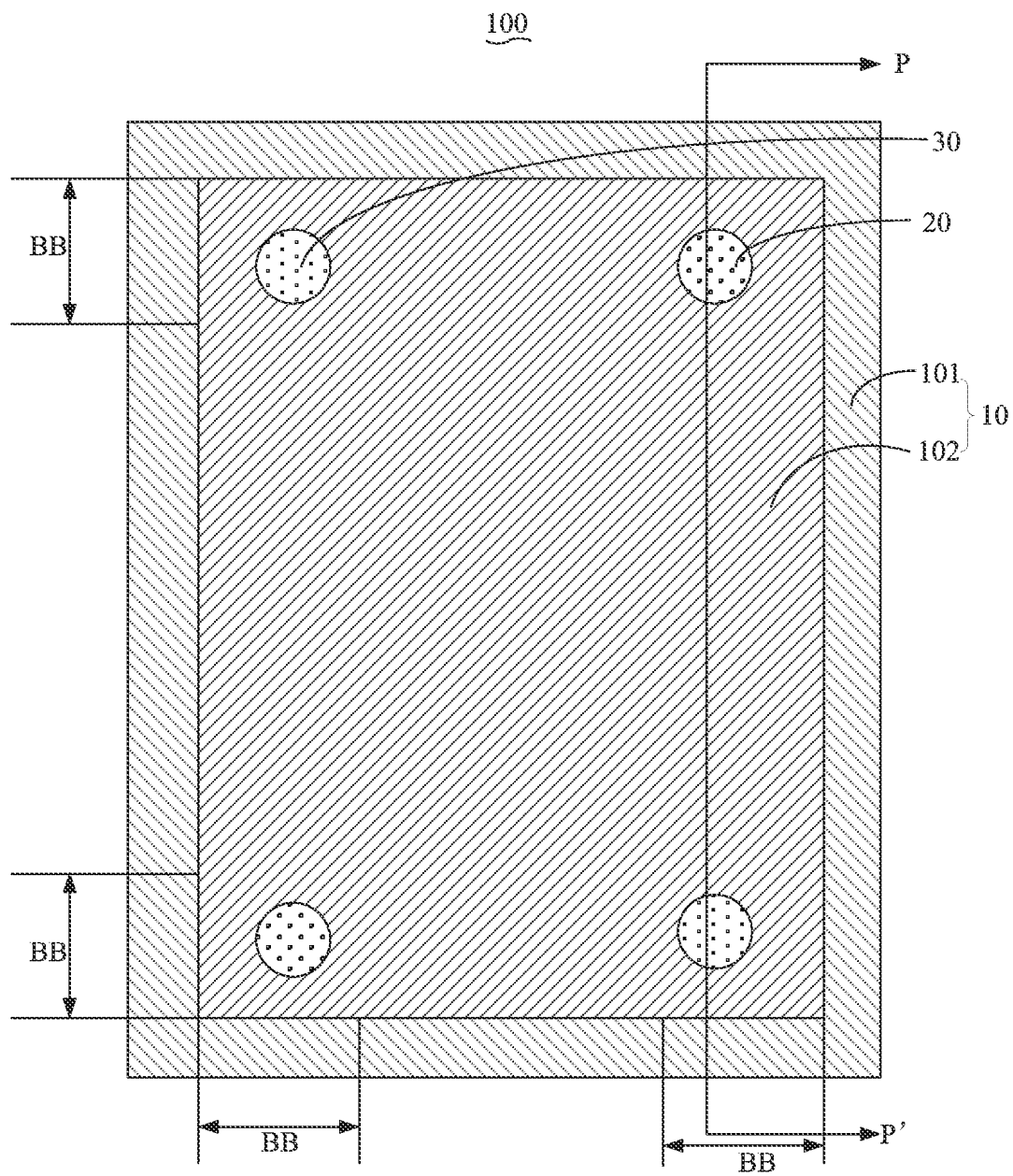
FIG. 5 is a diagram of a terminal according to a third embodiment of the present invention.

Please refer to FIG. 5. FIG. 5 is a diagram of a terminal according to a third embodiment of the present invention. The plate 102 is a rectangular base plate. The rectangular base plate has a peripheral area BB. The side plate 101 is surrounding the peripheral area BB. The peripheral area BB has four corners. The first camera modules 20 and the second camera modules 30 are respectively placed in the corners and the first camera modules 20 are adjacent to the second camera modules 30.

The terminal 100 further comprises a circuit main board, electrically connected to the camera module (the first camera module 20 and the second camera module 30).

The terminal of the present disclosure comprises: a shell, a first camera module and a second camera module; and a display panel, on the first camera module and the second camera module. The shell comprises a base plate and a side plate on the base plate, and the base place and the side plate form a storage space. The first camera module and the second camera module are located in the storage space. The first camera module is configured to obtain a light signal having a wavelength within a first wave band. The second camera module is configured to obtain a light signal having a wavelength within a first wave band. A minimum wavelength of the second wave band is greater than a maximum wavelength of the first wave band. The terminal has camera modules working in different wave bands. This could prevent the display panel from affecting the optical performance of the camera modules and thus raise the image quality.

Figure 6:
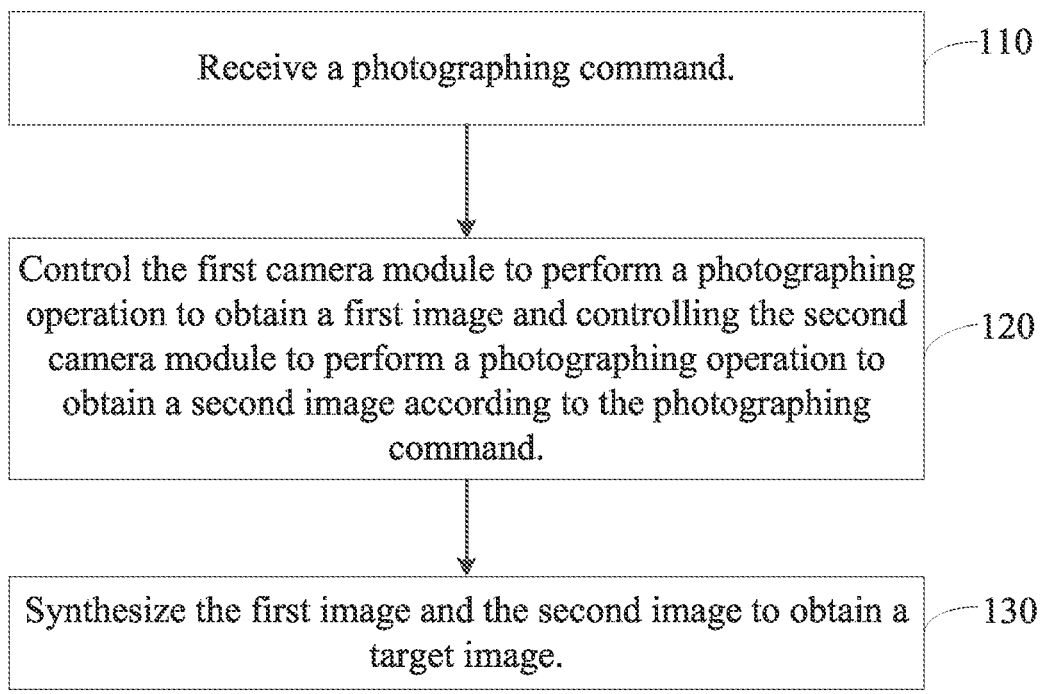
FIG. 6 is a flow chart of a photographing method according to an embodiment of the present invention.

Please refer to FIG. 6. FIG. 6 is a flow chart of a photographing method according to an embodiment of the present invention. The photographing method is used in a terminal. The terminal comprises: a shell, a first camera module and a second camera module; and a display panel, on the first camera module and the second camera module. The shell comprises a base plate and a side plate on the base plate, and the base place and the side plate form a storage space. The first camera module and the second camera module are located in the storage space. The first camera module is configured to obtain a light signal having a wavelength within a first wave band. The second camera module is configured to obtain a light signal having a wavelength within a first wave band. The minimum wavelength of the second wave band is greater than the maximum wavelength of the first wave band.

The photographing method comprises:

Step 110: Receive a photographing command.

Specifically, a user could click the virtual button on the display panel or a physical button to initiate a command of the camera mode to send the photographing command.

Step 120: Control the first camera module to perform a photographing operation to obtain a first image and controlling the second camera module to perform a photographing operation to obtain a second image according to the photographing command.

When the photographing command is received, the first camera module and the second camera module are turned on to take pictures of a target object. Accordingly, a first image is obtained from the first camera module and a second image is obtained from the second camera module.

Step 130: Synthesize the first image and the second image to obtain a target image.

Here, the first image and the second image are synthesized to obtain the target image.

Because the first camera module and second camera module work in different wave bands, the first image and the second image have differences. Therefore, the overlapping regions of the first image should be replaced with the overlapping regions of the second image. Please note, the first image should be compared with the second image to determine whether any overlapping region exists. The comparison could be performed by dividing the first image and the second image into multiple sub-images of the same size and then the similarity of each sub-image is matched to get a matching result.

Accordingly, the step 103 could further comprise:

Step 1031: Divide the first image into multiple first sub-images and divide the second image into multiple second sub-images.

Step 1032: Match the first sub-images with the second sub-images to obtain a matching result.

Step 1033: Determine whether the first image and the second image have an overlapping region according to the matching result.

Step 1034: If the first image and the second image have an overlapping region, then replacing the overlapping region of the first image with the overlapping region of the second image to obtain the target image.

In this embodiment, the first image is used as a basic and the overlapping region in the first image is replaced with the overlapping region of the second image. However, this is not a limitation of the present invention. Actually, the second image could be used as a basic and the overlapping region in the second image could be replaced with the overlapping region of the first image. This change also falls within the scope of the present invention.

According to the above-mentioned photographing method, a storage medium is disclosed. The storage medium stores multiple instructions, which could be executed by a processor to perform the above-mentioned photographing method.

A person having ordinary skill in the art could understand that a part or the entire steps could be performed by executing programs to instruct related hardware components. The programs could be stored in a computer readable storage medium, such as read only memory (ROM), random access memory (RAM), a hard disk and/or an optical disk.

Figure 7:
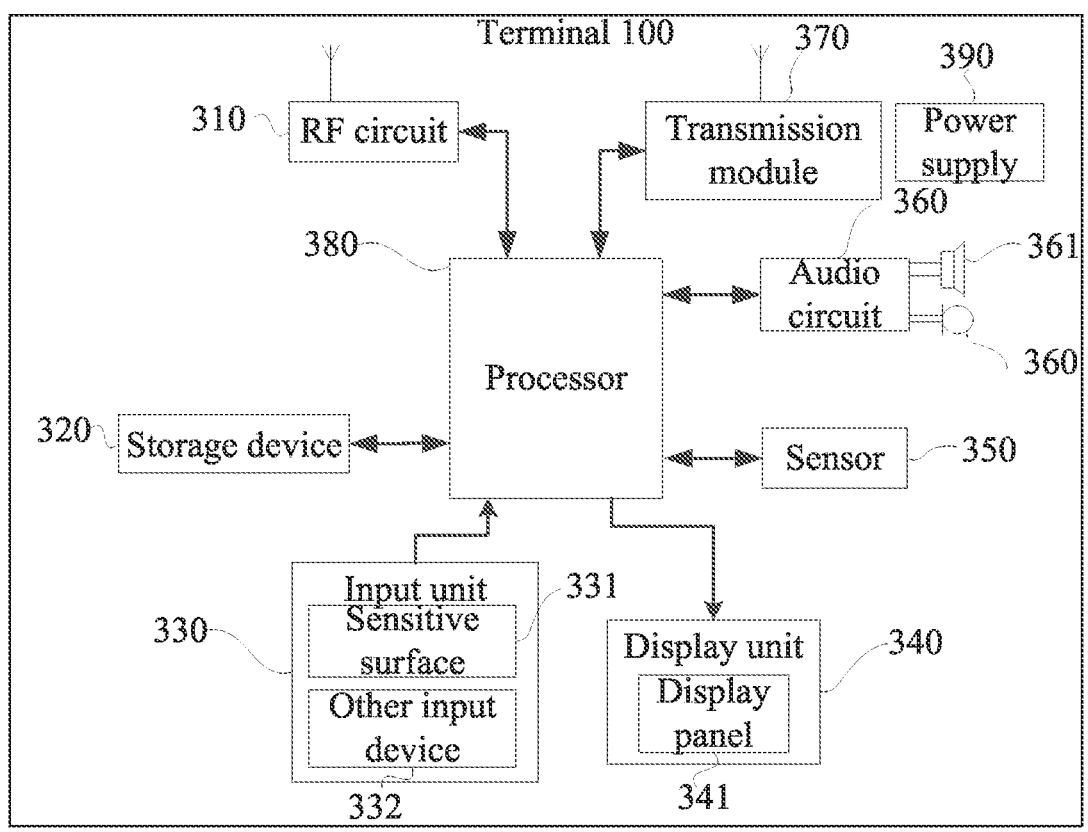
FIG. 7 is a functional block diagram of a terminal according to an embodiment of the present invention.

Please refer to FIG. 7. FIG. 7 is a functional block diagram of a terminal according to an embodiment of the present invention. The terminal 100 could comprise a radio frequency (RF) circuit 310, a storage device 320 having one or more computer readable storage medium, an input unit 330, a display unit 340, a sensor 350, an audio circuit 360, a transmission module 370, a processor 380 having one or more processing cores, and a power 390. A person having ordinary skill in the art could understand that the terminal 100 shown in FIG. 4 is not a limitation of the present invention. The terminal 100 could comprise less or more components or a combination or arrangement of the components.

The RF circuit 310 may be configured to receive and send a signal during an information receiving and sending process or a conversation process. Specifically, after receiving downlink information from a base station, the RF circuit 310 delivers the downlink information to one or more processors 180 for processing, and sends related uplink data to the base station. Generally, the RF circuit 310 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 310 may also communicate with a network and another device by wireless communication.

The storage device 320 may be configured to store a software program and module. The processor 380 runs the software program and module stored in the storage device 320, to implement various functional applications and data processing. The storage device 320 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the storage device 320 may include a high speed random access memory, and may also include a non-volatile memory, such as at least one magnetic disk storage device, a flash memory device, or another volatile solid-state storage device. Correspondingly, the storage device 320 may further include a memory controller, so that the processor 380 and the input unit 330 access the storage device 320.

The input unit 330 may be configured to receive input digit or character information, and generate keyboard, mouse, joystick, optical, or track ball signal input related to the user setting and function control. Specifically, the input unit 330 may include a touch-sensitive surface 331 and other input device 332. The touch-sensitive surface 331 may be referred to as a touch screen or a touch panel, and may collect a touch operation of a user on or near the touch-sensitive surface 331 (such as an operation of a user on or near the touch-sensitive surface by using any suitable object or attachment, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 380. Moreover, the touch controller can receive and execute a command sent from the processor 380. In addition, the touch-sensitive surface may be implemented by using various types, such as a resistive type, a capacitance type, an infrared type, and a surface sound wave type. In addition to the touch-sensitive surface, the input unit 330 may further include the another input device. Specifically, the another input device may include, but is not limited to, one or more of a physical keyboard, a functional key (such as a volume control key or a switch key), a track ball, a mouse, and a joystick.

The display unit 340 may be configured to display information input by the user or information provided for the user, and various graphical user ports of the mobile terminal. The graphical user ports may be formed by a graph, a text, an icon, a video, and any combination thereof. The display unit 340 may include a display panel 341. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 380, so as to determine a type of a touch event. Then, the processor 380 provides corresponding visual output on the display panel according to the type of the touch event. Although, in FIG. 7, the touch-sensitive surface and the display panel are used as two separate parts to implement input and output functions, in some embodiments, the touch-sensitive surface and the display panel may be integrated to implement the input and output functions.

The terminal 100 may further include at least one sensor 350, such as an optical sensor, a motion sensor, and other sensors. Specifically, the optical sensor may include an ambient light sensor and a proximity sensor. The ambient light sensor may adjust luminance of the display panel 341 according to brightness of the ambient light. The proximity sensor may switch off the display panel 341 and/or backlight when the terminal 100 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, hygrometer, a thermometer, and an infrared sensor, which may be configured in the terminal 100 are not further described herein.

The audio circuit 360, a loudspeaker 361, and a microphone 362 may provide audio interfaces between the user and the terminal 100. The audio circuit 360 may transmit, to the loudspeaker 361, a received electric signal converted from received audio data. The loudspeaker 361 converts the electric signal into a sound signal for output. On the other hand, the microphone 362 converts a collected sound signal into an electric signal. The audio circuit 360 receives the electric signal and converts the electric signal into audio data, and outputs the audio data to the processor 380 for processing. Then, the processor 380 sends the audio data to, for example, another terminal by using the RF circuit 310, or outputs the audio data to the storage device 320 for further processing. The audio circuit 360 may further include an earplug jack, so as to provide communication between a peripheral earphone and the terminal 100.

The terminal 100 may help, by using the transmission module 370 (e.g. Wi-Fi module), a user to receive and send an e-mail, browse a webpage, and access stream media, and the like, which provides wireless broadband Internet access for the user.

The processor 380 is a control center of the terminal 100, and connects various parts of the terminal by using various interfaces and lines. By running or executing the software program and/or module stored in the storage device 320, and invoking data stored in the storage device 320, the processor 380 performs various functions and data processing of the terminal 100, thereby performing overall monitoring on the mobile phone. Optionally, the processor 380 may include one or more processing cores. Preferably, the processor 380 may integrate an application processor and a modem. The application processor mainly processes an operating system, a user interface, an application program, and the like. The modem mainly processes wireless communication. It may be understood that, the foregoing modem may not be integrated into the processor 380.

The processor 380 includes an Arithmetic Logic Unit (ALU), ab application processor, a Global Positioning System (GPS), and a control and status bus (not shown).

The terminal 100 further includes the power supply 390 (such as a battery) for supplying power to the components. Preferably, the power supply may be logically connected to the processor 380 by using a power supply management system, thereby implementing functions, such as charging, discharging, and power consumption management, by using the power supply management system. The power supply 390 may further include any component, such as one or more direct current or alternate current power supplies, a re-charging system, a power supply fault detection circuit, a power supply converter or an inverter, and a power supply state indicator.

Although not shown, the mobile terminal 100 may further comprise a camera (such as a front camera, a rear camera), a Bluetooth module, and the like, and a description in this regard is not provided.

In greater detail, a display unit 340 of the mobile terminal 100 is a touch screen display according to the present embodiment. The mobile terminal 100 further comprises a storage device 320 and one or more programs. The one or more programs are stored in the storage device 320, and are configured to be executed by one or more processors to perform operations comprising:

receiving a photographing command;

controlling the first camera module to perform a photographing operation to obtain a first image and controlling the second camera module to perform a photographing operation to obtain a second image according to the photographing command; and synthesizing the first image and the second image to obtain a target image.

The operation of synthesizing the first image and the second image to obtain the target image comprises:

dividing the first image into a plurality of first sub-images and dividing the second image into a plurality of second sub-images;

matching the first sub-images with the second sub-images to obtain a matching result;

determining whether the first image and the second image have an overlapping region according to the matching result; and if the first image and the second image have an overlapping region, then replacing the overlapping region of the first image with the overlapping region of the second image to obtain the target image.

The above embodiments may have different focuses. One embodiment may not disclose something in details but those details could be referred to another embodiment. Accordingly, a person having ordinary skill in the art could easily combine one embodiment with another embodiment.

Above are embodiments of the present invention, which does not limit the scope of the present invention. Any modifications, equivalent replacements or improvements within the spirit and principles of the embodiment described above should be covered by the protected scope of the invention.

What is claimed is:

1. A terminal, comprising:

a shell, comprising a base plate and a side plate on the base plate, wherein the base place and the side plate form a storage space;

a first camera module and a second camera module, located in the storage space; and a display panel, disposed on the first camera module and the second camera module, wherein the display panel is a transparent display panel having a transparent portion corresponding to the first camera module and the second camera module;

wherein the first camera module is configured to obtain a visible light signal having a wavelength within a first wave band, the second camera module is configured to obtain a visible light signal having a wavelength within a second wave band, and a minimum wavelength of the second wave band is greater than a maximum wavelength of the first wave band.

2. The terminal of claim 1, wherein the first camera module comprises orderly arranged a first light sensing chip, a first filter, and a first camera; the display panel is close to a side of the first camera module; the side of the first camera module has the first camera; and a center wavelength of the first filter is 350 nm-750 nm.

3. The terminal of claim 2, wherein the first filter has a transparent rate of 75% for a specific wavelength range of visible light.

4. The terminal of claim 2, wherein the center wavelength of the first filter is 400 nm-500 nm.

5. The terminal of claim 2, wherein the first light sensing chip is a CCD chip or a CMOS chip.

6. The terminal of claim 2, wherein the first camera module further comprises a first circuit board, a first supporting structure, and a first voice coil motor; the first lighting sensing chip is positioned on the first circuit board; and the first supporting structure is configured to support the first filter and the first voice coil motor.

7. The terminal of claim 1, wherein the second camera module comprises orderly arranged a second light sensing chip, a second filter, and a second camera; the display panel is close to a side of the second camera module; the side of the second camera module has the second camera; and a center wavelength of the second filter is 3000 nm-10 μm.

8. The terminal of claim 7, wherein the second camera module further comprises a second circuit board, a second supporting structure, and a second voice coil motor.

9. The terminal of claim 1, further comprising:
a plurality of rows of the first camera modules in the storage space;
wherein the second camera module is located between two adjacent rows of the first camera modules.

10. The terminal of claim 1, wherein the base plate is a rectangular base plate, having a peripheral area; the side plate is surrounding the peripheral area; the peripheral area has four corners; the first camera module and the second camera module are respectively placed in the corners; and the first camera module is adjacent to the second camera module.

11. The terminal of claim 1, further comprising:
a circuit main board, electrically connected to the first camera module and the second camera module.

12. The terminal of claim 1, further comprising:
a cover, on the display panel, configured to protect the display panel.

* * * * *